3,045,008
NOVEL 1,4-DIAZEPINES
Joseph G. Lombardino, New London, William M. Mc-
Lamore, Groton, and Gerald D. Laubach, Niantic,
Conn., assignors to Chas. Pfizer & Co., Inc., New York,
N.Y., a corporation of Delaware
No Drawing. Filed Feb. 16, 1960, Ser. No. 8,916
9 Claims. (Cl. 260—239.3)

This invention relates to new and useful heterocyclic compounds as well as to novel methods and intermediates for their preparation. More particularly, the present invention is concerned with novel organic nitrogen compounds which possess a unique seven-membered heterocyclic ring system; it is also concerned with the non-toxic acid addition salts of these novel organic nitrogen compounds. There is also included within the scope of this invention various pharmaceutical compositions which have at least one of the herein described compounds as their essential active ingredient.

The compounds which are included within the purview of this invention are selected from the class of 1,4-diazepines corresponding to the following general structural formula:

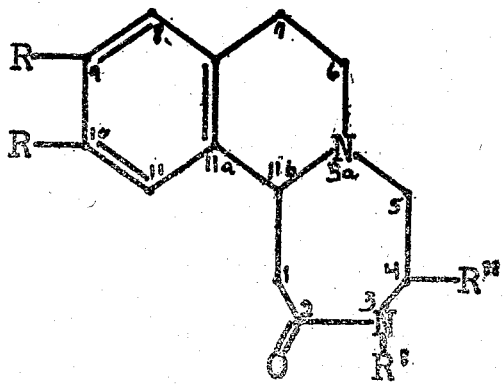

wherein each R represents a member of the group consisting of hydrogen, hydroxy, lower alkoxy and alkyl, and when both R groups are taken together they form a methylenedioxy group, R' represents a member of the group consisting of hydrogen, lower alkenyl, alkyl, hydroxyalkyl, acyloxyalkyl, lower alkoxyalkyl, lower dialkylaminoalkyl and aralkyl, R" represents a member of the group consisting of hydrogen, lower alkenyl, alkyl, hydroxyalkyl, acyloxyalkyl, lower alkoxyalkyl lower dialkylaminoalkyl, aralkyl and aryl, each alkyl moiety in R, R' and R" having from one to five carbon atoms and said acyl moiety being derived from a hydrocarbon carboxylic acid having from two to eight carbon atoms; and the pharmaceutically acceptable acid addition and quaternary ammonium salts thereof. The system of nomenclature employed throughout this specification is that based on the Patterson system as is illustrated by the foregoing structural formula for a naphth-[1,2-a]-2-oxo-1,2,3,4,5,6,7-heptahydro-11b-H-[3,5a]diazepine [e.g., see A. M. Patterson and L. T. Capell, The Ring Index, Reinhold Publishing Corp., New York (1940)].

In accordance with the present invention, the aforementioned 1,4-diazepine derivatives have been found to possess interesting pharmaceutical properties which render them useful as synthetic medicinals. More particularly, these compounds have been shown to exhibit utility as transquilizing or hypotensive agents. Of especial value in this connection are those 1,4-diazepines which have both a 9,10-dimethoxy grouping and a 4-substituent as previously defined adjacent to the ring nitrogen atom of the amide functional group, typical 4-substituents include such groups as allyl, n-butyl, isoamyl, γ-hydroxypropyl, β-(3,4,5-trimethoxybenzoyloxy)ethyl, γ-dimethylaminopropyl, p-chlorobenzyl and benzoylamino.

In accordance with the process for preparing the compounds of this invention, an appropriately substituted 2-oxobenzopyridocoline in contacted via its 2-oximino derivative with a strongly acidic reagent whereby it undergoes a Beckmann rearrangement to form the desired 1,4-diazepine as is illustrated by the following equation wherein R and R" are both as previously defined:

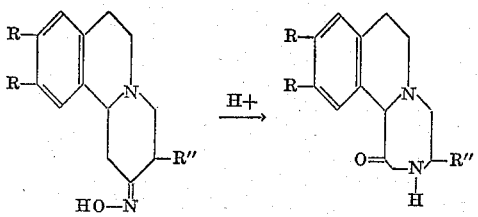

Subsequent conversion of the resulting naphth-[1,2-a]-2-oxo-1,2,3,4,5,6,7-heptahydro-11b-H-[3,5a]diazepine to the corresponding 3-substituted compounds can easily be effected by any number of standard organic procedures previously disclosed in the prior art such as, for example, by treating said diazepine compound with an alkali metal hydride and subsequently reacting the intermediate alkali metallo derivative with the desired organic halide R'X.

In accordance with a more specific embodiment of the process of this invention, the foregoing illustrated novel rearrangement is most desirably conducted in the presence of a strongly acidic reagent such as, for example, 73–85% sulfuric acid, 85% polyphosphoric acid, phosphorus pentoxide, phosphorus pentachloride, aluminum chloride, zinc chloride, and hydrogen chloride, the metal halides being preferred in the case of compounds containing acid-sensitive groups such as the acyloxy group. As a matter of fact, most of the reagents ordinarily used to effect a Beckmann rearrangement can be suitably employed in this particular reaction. In general, the process of this invention is ordinarily carried out in a reaction-inert solvent medium such as an aromatic hydrocarbon like benzene, toluene, xylene, nitrobenzene, and so forth, although it is possible to dispense with such a solvent if an excess of the acidic reagent can be employed for the very same purpose as is the case say, for instance, with 85% sulfuric or polyphosphoric acids. It should also be noted that while the aforementioned rearrangement reaction will usually occur under these conditions at any temperature that is in the range of from about 20° C. to about 150° C., it is most desirable in practice to conduct the reaction in the 120–135° C. range for a period of at least about ten minutes in order to achieve the most effective results.

The benzopyridocoline starting materials used in the process of this invention are all prepared by the general procedure devised by A. Brossi et al. as described in Helvetica Chimica Acta, vol. 41, p. 119 (1958). This method involves condensing an appropriately substituted 1-carbalkoxymethyl-1,2,3,4-tetrahydroisoquinoline with formaldehyde in the presence of an α-hydrocarbylmalonic acid ester. The 1-carboalkoxymethyl-1,2,3,4-tetrahydroisoquinoline so employed is readily obtainable by any number of known procedures previously disclosed in the prior art and preferably by the method described by J. M. Osbond in the Journal of the Chemical Society (London), 1951, p. 3646 and ibid, 1953, p. 2463, which involves reacting an appropriately substituted β-phenylethylamine with a carboalkoxyacetyl chloride, followed by a cyclization of the substituted malonamic ester so obtained and subsequent catalytic hydrogenation of the resulting cyclized product.

The acids which are used to prepare the pharmaceutically acceptable acid addition salts of the aforementioned 1,4-diazepine bases are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, oxalate, succinate, maleate, gluconate and saccharate salts. Suitable quaternary ammonium salts of the diazepine derivatives of this invention include those which are obtained by reacting diazepine bases of the foregoing type with a pharmaceutically acceptable organic halide, such as methyl iodide, ethyl chloride, allyl chloride, benzyl bromide, and the like, or with an equally acceptable sulfuric acid lower alkyl ester or an arylsulfonic acid lower alkyl ester, such as dimethyl sulfate, diethyl sulfate, methyl benzenesulfonate, ethyl p-toluenesulfonate, and the like.

As previously indicated, the compounds of the present invention are readily adapted to therapeutic use as hypotensive agents in addition to being useful as sedatives in view of their ability to reduce serotonin and norepinephrine blood levels in the brain. Furthermore, the toxicity of these 1,4-diazepines has been found to be quite low when they are administered to mice in amounts that are sufficient to achieve the desired effects as hereinafter indicated, while no harmful pharmacological side effects have been observed to occur as a result of their administration. The aforementioned biological activity of the herein described compounds is well illustrated by a series of tests previously described in the literature and hence, well-known to those skilled in the art. For instance, the percent decrease in serotonin and norepinephrine levels in the rabbit is determined in accordance with the procedure described by P. Shore et al. in the Journal of Pharmacology and Experimental Therapeutics, vol. 122, p. 295 (1958), as well as by S. Udenfriend et al. in Science, vol. 122, p. 972 (1955).

In accordance with a method of treatment of the present invention, the herein described 1,4-diazepine derivatives can be administered to an agitated subject via the oral or parenteral routes. In general, these compounds are most desirably administered in doses ranging from about 50 mg. to about 500 mg. per day, although variations will necessarily occur depending upon the weight of the subject being treated and the particular route of administration chosen. However, a dosage level that is in the range of from about 0.7 mg. to about 7.0 mg. per kg. of body weight per day is most desirably employed in order to achieve effective results. Nevertheless, it is to be appreciated that still other variations may also occur in this respect, depending upon the severity of the patient's condition and its individual response to said medicament, as well as on the particular type of formulation chosen and the time period and interval at which such administration is carried out. In some instances, dosage levels below the lower limit of the aforesaid range may be more than adequate, while in other cases still larger dosages may be employed without causing any harmful or deleterious side effects provided that such higher levels are first divided into several smaller doses that are to be administered throughout the day.

In connection with the use of the 1,4-diazepine compounds of this invention for the treatment of agitated subjects, it is to be noted that they may be administered either alone or in combination with a pharmaceutically acceptable carrier by either of the routes previously indicated, and that such administration can be carried out in both single and multiple dosages. More particularly, the novel compounds of this invention can be administered in a wide variety of dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be sweetened and flavored by means of various agents of the type commonly employed for such a purpose. In general, the therapeutically-active compounds of this invention are present in such dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-shelled gelatin capsules; preferred materials in this connection also include lactose or milk sugar as well as high molecular weight polyethylene glycols. When aqueous suspensions and/or elixirs are desired for oral administration, the essential active ingredient may be combined with various sweetening and flavoring agents, coloring matter or dyes and, if so desired, emulsifying and/or suspending agents, together with such diluents as water, ethanol, propylene glycol, glycerin and various combinations thereof.

For purposes of parenteral administration, solutions of the 1,4-diazepine bases in sesame or peanut oil or in aqueous-propylene glycol may be employed, as well as sterile aqueous solutions of the corresponding water-soluble salts previously enumerated. Such aqueous solutions should be suitably buffered if necessary and the liquid diluent rendered isotonic with sufficient saline or glucose. These latter solutions are especially suitable for intravenous, intromuscular and subcutaneous injection purposes. In this connection, the sterile aqueous media employed are readily obtained by standard techniques well-known to those in the art. For instance, distilled water is ordinarily used as the liquid diluent and the final preparation is passed through a suitable bacterial filter, such as a sintered glass filter or a diatomaceous earth or unglazed porcelain filter. Preferred filters of this type include the Berkefeld, the Chamberland and the asbestos disc-metal Seitz filter, wherein the fluid is sucked through the filter candle into a sterile container with the aid of a suction pump. Needless to say, the necessary precautions should be taken throughout the preparation of these injectable solutions in order to assure that the final products be obtained in a sterile condition.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

The 2 - oxo - 1,2,3,4,6,7 - hexahydro - 11b - H - benzopyridocolines prepared in accordance with the previously referred to procedure of A. Brossi et al. [Helv. Chim. Acta., 41, 119 (1956)], are each subjected to the reaction procedure described in Organic Syntheses, coll. vol. 2, John Wiley and Sons, Inc., New York (1948), p. 76, to afford the corresponding 2-oximes. For instance, 2-oxo - 3 - ethyl - 9,10 - dimethoxy - 1,2,3,4,6,7 - hexahydro-11b-H-benzopyridocoline is converted to 2-oximino-3-ethyl - 9,10 - dimethoxy - 1,2,3,4,6,7 - hexahydro - 11b-

H-benzopyridocoline. In like manner, all the other 2-oximinobenzopyridocolines hereinafter employed as starting materials in the examples which follow are respectively prepared from their corresponding 2-oxobenzopyridocolines.

*Example II*

A mixture consisting of 0.250 g. (0.00083 mole) of 2-oximino-3-ethyl - 9,10 - dimethoxy-1,2,3,4,6,7-hexahydro-11b-H-benzopyridocoline (M.P. 175–178° C.) suspended in 15 ml. of polyphosphoric acid is slowly heated to 130° C. with constant agitation being maintained throughout this step. As soon as the reaction mixture attains this temperature, a light orange-colored solution is obtained. The latter solution is then maintained at this point for an additional ten minutes before it is cooled to room temperature and poured into 200 ml. of cold water. The resulting aqueous solution is then made basic with 20% aqueous sodium hydroxide and extracted with an equal volume of methylene chloride. The organic extract so obtained is dried over anhydrous sodium sulfate, filtered and the resulting filtrate concentrated under reduced pressure to afford 0.108 g. of soft yellow crystals. Recrystallization of the latter material from ethanol-water yields 0.035 g. (14%) of naphth-[1,2-a]-2-oxo-4-ethyl-9,10-dimethoxy - 1,2,3,4,5,6,7 - heptahydro - 11b-H-[3,5a]diazepine, melting at 185–192° C.

*Analysis.*—Calcd. for $C_{17}H_{24}N_2O_3$: C, 67.08; H, 7.95; N, 9.21. Found: C, 67.37; H, 8.02; N, 9.14.

*Example III*

The procedure described in Example II is followed except that other 2-oximinobenzopyridocolines are individually employed as the starting materials in this reaction in lieu of the 2-oximino-3-ethyl-9,10-dimethoxy-1,2,3,4,6,7-hexahydro-11b-H-benzopyridocoline of the previous example; in each case, the corresponding 1,4-diazepine is the product obtained. Thus, when 2-oximino-3-(n-butyl)-9,10-dimethoxy - 1,2,3,4,6,7 - hexahydro-11b - H - benzopyridocoline is subjected to the same reaction conditions as described in Example II, the corresponding product obtained is naphth-[1,2-a]-2 - oxo - 4-(n-butyl)-9,10-dimethoxy-1,2,3,4,5,6,7-heptahydro-11b-H-[3,5a]diazepine. Similarly, 2-oximino-3-(isobutyl)-9,10-dimethoxy-1,2,3,4,6,7-hexahydro-11b-H-benzopyridocoline is converted to naphth-[1,2-a]-2 - oxo - 4-isobutyl-9,10-dimethoxy-1,2,3,4,5,6,7-heptahydro-11b-H-[3,5a]diazepine; 2-oximino-3-(β-hydroxyethyl) - 9,10 - dimethoxy-1,2,3,4,6,7-hexahydro-11b-H-benzopyridocoline is converted to naphth-[1,2-a]-2-oxo - 4 - (β - hydroxyethyl)-9,10-dimethoxy-1,2,3,4,5,6,7-heptahydro-11b-H-[3,5a]diazepine; and 2-oximino-3-(p-chlorobenzyl) - 9,10 - dimethoxy-1,2,3,4,6,7-hexahydro-11b-H-benzopyridocoline is converted to naphth-[1,2-a]-2-oxo - 4 - (p-chlorobenzyl)-9,10-dimethoxy-1,2,3,4,5,6,7-heptahydro-11b-H-[3,5a]diazepine.

In like manner, 2-oximino-3-methyl-9,10-dimethoxy-1,2,3,4,6,7-hexahydro-11b-H-benzopyridocoline is converted to naphth-[1,2-a]-2-oxo-4-methyl-9,10-dimethoxy-1,2,3,4,5,6,7-heptahydro - 11b - H-[3,5a]diazepine; 2-oximino-3-isoamyl-9,10-dimethoxy - 1,2,3,4,6,7 - hexahydro-11b-H-benzopyridocoline is converted to naphth-[1,2-a]-2-oxo-4-isoamyl - 9,10 - dimethoxy - 1,2,3,4,5,6,7 - heptahydro-11b-H-[3,5a]diazepine; 2-oximino-3-(γ-hydroxypropyl)-9,10-dimethoxy-1,2,3,4,6,7-hexahydro - 11b - H - benzopyridocoline is converted to naphth-[1,2-a]-2-oxo-4-(γ-hydroxypropyl)-9,10-dimethoxy - 1,2,3,4,5,6,7 - heptahydro-11b-H-[3,5a]diazepine; 2-oximino-3-(β-methoxyethyl)-9,10-dimethoxy - 1,2,3,4,6,7-hexahydro-11b-H-benzopyridocoline is converted to naphth-[1,2-a]-2-oxo-4-(β-methoxyethyl) - 9,10-dimethoxy-1,2,3,4,5,6,7-heptahydro-11b-H-[3,5a]diazepine; 2-oximino-3-(γ-methoxypropyl)-9,10-dimethoxy - 1,2,3,4,6,7 - hexahydro-11b-H-benzopyridocoline is converted to naphth-[1,2-a]-2-oxo-4-(γ-methoxypropyl)-9,10 - dimethoxy - 1,2,3,4,5,6,7-heptahydro-11b-H-[3,5a]diazepine; 2-oximino - 3 - (γ-isopropoxypropyl) - 9,10 - dimethoxy - 1,2,3,4,6,7-hexahydro-11b-H-benzopyridocoline is converted to naphth-[1,2-a]-2-oxo-4-(γ-isopropoxypropyl) - 9,10 - dimethoxy - 1,2,3,4,5,6,7-heptahydro-11b-H-[3,5a]diazepine; 2-oximino-3-[β-(3,4,5 - trimethoxybenzoyloxy)ethyl]-9,10-dimethoxy-1,2,3,4,6,7-hexahydro-11b-H-benzopyridocoline is converted to naphth-[1,2-a]-2-oxo - 4 - [β(3,4,5-trimethoxybenzoyloxy)ethyl] - 9,10 - dimethoxy-1,2,3,4,5,6,7-heptahydro-11b-H-[3,5a]diazepine; 2-oximino-3-allyl-9,10-dimethoxy - 1,2,3,4,6,7-hexahydro-11b-H-benzopyridocoline is converted to naphth-[1,2-a]-2-oxo-4-allyl-9,10-dimethoxy-1,2,3,4,5,6,7-heptahydro - 11b - H - [3,5a]diazepine; 2-oximino - 3 - (β-methylallyl)-9,10-dimethoxy-1,2,3,4,6,7-hexahydro-11b-H-benzopyridocoline is converted to naphth-[1,2-a]-2-oxo - 4 - (β-methylallyl)-9,10-dimethoxy-1,2,3,4,5,6,7-heptahydro - 11b - H - [3,5a]diazepine; 2-oximino - 3 - (β-diethylaminoethyl)-9,10-dimethoxy-1,2,3,4,6,7-hexahydro-11b-H-benzopyridocoline is converted to naphth-[1,2-a]-2-oxo-4-(β-diethylaminoethyl)-9,10-dimethoxy - 1,2,3,4,5,6,7 - heptahydro-11b-H-[3,5a]diazepine; 2-oximino-3-(γ-dimethylaminopropyl)-9,10-dimethoxy-1,2,3,4,6,7-hexahydro - 11b - H-benzopyridocoline is converted to naphth-[1,2-a]-2-oxo-4-(γ-dimethylaminopropyl)-9,10-dimethoxy - 1,2,3,4,5,6,7-heptahydro-11b-H-[3,5a]diazepine; 2-oximino-3-benzyl-9,10-dimethoxy-1,2,3,4,6,7-hexahydro-11b-H-benzopyridocoline is converted to naphth-[1,2-a]-2-oxo-4-benzyl-9,10-dimethoxy-1,2,3,4,5,6,7-heptahydro - 11b - H - [3,5a]diazepine; 2-oximino-3-(β-phenylethyl) - 9,10 - dimethoxy-1,2,3,4,6,7-hexahydro-11b-H - benzopyridocoline is converted to naphth-[1,2-a]-2-oxo-4-(β-phenylethyl) - 9,10-dimethoxy-1,2,3,4,5,6,7 - heptahydro - 11b - H-[3,5a]diazepine; 2-oximino-3-(m-xylyl)-9,10-dimethoxy - 1,2,3,4,6,7 - hexahydro-11b-H-benzopyridocoline is converted to naphth-[1,2-a] - 2 - oxo-4-(m-xylyl)-9,10-dimethoxy-1,2,3,4,5,6,7-heptahydro-11b - H - [3,5a]diazepine; 2-oximino-3-(p-chlorobenzhydryl) - 9,10 - dimethoxy-1,2,3,4,6,7-hexahydro-11b-H-benzopyridocoline is converted to naphth-[1,2-a]-2-oxo-4-(p-chlorobenzhydryl) - 9,10-dimethoxy-1,2,3,4,5,6,7-heptahydro-11b-H-[3,5a]diazepine; 2-oximino-3-(2-thenyl) - 9,10 - dimethoxy-1,2,3,4,6,7-hexahydro-11b-H-benzopyridocoline is converted to naphth-[1,2-a]-2-oxo-4-(2-thenyl)9,10-dimethoxy - 1,2,3,4,5,6,7-heptahydro-11b-H-[3,5a]diazepine; and 2-oximino - 3 - (2-furfuryl) - 9,10 - dimethoxy-1,2,3,4,6,7-hexahydro-11b-H-benzopyridocoline is converted to naphth-[1,2-a]-2-oxo-4-(2-furfuryl) - 9,10 - dimethoxy-1,2,3,4,5,6,7-heptahydro-11b-H-[3,5a]diazepine.

In the same manner, 2-oximino-3-phenyl-9,10-dimethoxy - 1,2,3,4,6,7 - hexahydro-11b-H-benzopyridocoline is converted to naphth-[1,2-a]-2-oxo-4-phenyl-9,10-dimethoxy-1,2,3,4,5,6,7 - heptahydro - 11b-H-[3,5a]diazepine; 2-oximino-3-(p-chlorophenyl)-9,10 - dimethoxy-1,2,3,4,6,7-hexahydro-11b-H-benzopyridocoline is converted to naphth-[1,2-a] - 2 - oxo-4-(p-chlorophenyl)9,10-dimethoxy - 1,2,3,4,5,6,7 - heptahydro-11b-H-[3,5a]diazepine; 2-oximino-3-(p-tolyl) - 9,10 - dimethoxy-1,2,3,4,6,7-hexahydro-11b-H-benzopyridocoline is converted to naphth-[1,2-a]-2-oxo - 4 - (p-tolyl)9,10-dimethoxy-1,2,3,4,5,6,7-heptahydro-11b-H-[3,5a]diazepine; 2-oximino-3-(p-anisyl) - 9,10 - dimethoxy - 1,2,3,4,6,7 - hexahydro - 11b-H-benzopyridocoline is converted to naphth-[1,2-a]-2-oxo-4-(p-anisyl) - 9,10 - dimethoxy-1,2,3,4,5,6,7-heptahydro-11b-H-[3,5a]diazepine; 2-oximino-3-(2-thienyl)-9,10-dimethoxy - 1,2,3,4,6,7-hexahydro-11b-H-benzopyridocoline is converted to naphth-[1,2-a]-2-oxo-4-(2-thienyl)-9,10-dimethoxy - 1,2,3,4,5,6,7 - heptahydro-11b-H-[3,5a]diazepine; 2-oximino-3-(2-furyl) - 9,10 - dimethoxy-1,2,3,4,6,7-hexahydro-11b-H-benzopyridocoline is converted to naphth-[1,2-a] - 2 - oxo-4-(2-furyl)-9,10-dimethoxy-1,2,3,4,5,6,7-heptahydro-11b-H-[3,5a]diazepine; 2-oximino-3-(n-propyl) - 9,10 - diethoxy-1,2,3,4,6,7-hexahydro-11b-H-benzopyridocoline is converted to naphth-[1,2-a]-2-oxo-4-(n-propyl) - 9,10 - diethoxy-1,2,3,4,5,6,7-heptahydro-11b-H-[3,5a]diazepine; 2-oximino-3-ethyl-9,10-methylenedioxy - 1,2,3,4,6,7-hexahydro-11b-H-benzopyridocoline is converted to naphth-[1,2-a]-2-oxo-4-ethyl-9, 10-methylenedioxy - 1,2,3,4,5,6,7 - heptahydro-11b-H-[3,5a]diazepine; 2-oximino-3-methyl-9,10-di(n-butoxy)-1,2,3,4,6,7-hexahydro-11b-H-benzopyridocoline is converted to naphth-[1,2-a]-2-oxo - 4 - methyl-9,10-di(n-butoxy) - 1,2,3,4,5,6,7 - heptahydro - 11b - H-[3,5a]diazepine; 2-oximino-3-(β-hydroxyethyl)-9,10-di(isoamyloxy)-1,2,3,4,6,7-hexahydro-11b-H-benzopyridocoline is converted to naphth-[1,2-a]-2-oxo-4-(β-hydroxyethyl)-9,10-di(isoamyloxy) - 1,2,3,4,5,6,7 - heptahydro - 11b-H-[3,5a]diazepine; and 2-oximino-3-(n-amyl)-9,10-dihydroxy - 1,2,3,4,6,7 - hexahydro-11b-H-benzopyridocoline is converted to naphth-[1,2-a]-2-oxo-4-(n-amyl)-9,10-dihydroxy-1,2,3,4,5,6,7-heptahydro-11b-H-[3,5a]diazepine.

*Example IV*

The naphth-[1,2-a]-2-oxo-9,10-disubstituted-1,2,3,4,5,6,7-heptahydro-11b-H-[3,5a]diazepines reported in the previous two examples are each individually subjected to the N-alkylation procedure described by W. Fones in the Journal of Organic Chemistry, vol. 14, p. 1099 (1949), employing the following compounds as alkylating agents: allyl chloride, β-methallyl bromide, methyl iodide, dimethyl sulfite, diethyl sulfate, n-propyl iodide, isoamyl bromide, β-hydroxyethyl bromide, γ-hydroxypropyl iodide, β-(3,4,5-trimethoxybenzoyloxy)-ethyl bromide, β-diethylaminoethyl chloride, γ-dimethylaminopropyl iodide, benzyl chloride, p-chlorobenzyl chloride, m-xylyl bromide and β-phenylethyl bromide. Thus, the 3-sodiometallo derivative of naphth-[1,2-a]-2-oxo-4-ethyl-9,10-dimethoxy-1,2,3,4,5,6,7-heptahydro - 11b - H - [3,5a]diazepine reacts with benzyl bromide in accordance with this procedure to afford naphth-[1,2-a]-2-oxo-3-benzyl-4-ethyl-9,10-dimethoxy - 1,2,3,4,5,6,7 - heptahydro-11b-H-[3,5a]diazepine. In like manner, each of the other previously reported 1,4-diazepines individually react in the form of their sodiometallo derivatives with any one of the foregoing alkylating agents to afford the corresponding 3-substituted compound.

*Example V*

Naphth-[1,2-a] - 2 - oxo-4-[β-(3,4,5 - trimethoxybenzoyloxy] - 9,10-dimethoxy - 1,2,3,4,5,6,7 - heptahydro-11b-H-[3,5a]diazepine is prepared by treating the corresponding non-acylated 1,4-diazepine in chloroform with 3,4,5-trimethoxybenzoyl chloride at room temperature for about 15 minutes; this product is identical with that described in Example III as attested to by melting point and mixed melting point determinations.

In the same manner, treatment of each of the other hydroxyalkyl-substituted 1,4-diazepines described in the previous examples with 3,4,5-trimethoxybenzoyl chloride affords the corresponding 3,4,5-trimethoxybenzoyl esters. Moreover, other hydrocarbon carboxylic acid esters of these hydroxyalkyl substituted 1,4-diazepine derivatives have also been prepared via this same procedure by merely employing the appropriate acyl chloride in each case; such other esters which have been specifically obtained in this manner include the acetate, propionate, valerate, caproate, benzoate, p-chlorobenzoate, phenylacetate, 2-thenoate and 2-furoate. For instance, naphth-[1,2-a] - 2 - oxo - 4 - (β-hydroxyethyl)-9,10-dimethoxy-1,2,3,4,5,6,7 - heptahydro - 11b - H-[3,5a]diazepine and acetyl chloride react to afford the corresponding acetate, while naphth - [1,2-a]-2-oxo-4-(γ-hydroxypropyl) - 9,10-dimethoxy - 1,2,3,4,5,6,7 - heptahydro - 11b - H - [3,5a]-diazepine and benzoyl chloride react to afford the corresponding benzoate.

*Example VI*

The non-toxic acid addition salts of each of the 1,4-diazepine derivatives described in the previous examples are prepared by either one of two general methods. In the case of the hydrohalide salts, such as the hydrochloride, hydrobromide and hydriodide, this is accomplished by first dissolving the 1,4-diazepine base compound in absolute ether followed by introduction of the appropriate hydrogen halide gas into the solution until the latter is completely saturated with respect to this reagent, whereupon the desired product precipitates from the solution; the crystalline material so obtained is then recrystallized from acetone to yield the pure hydrohalide salt. Thus, when 3 g. (0.01 mole) of naphth-[1,2a]-2-oxo-4-ethyl-9,10-dimethoxy - 1,2,3,4,5,6,7 - heptahydro-11b-H-[3,5a]-diazepine reacts with at least an equimolar amount of hydrogen chloride as described in the above manner, the corresponding product obtained is naphth-[1,2-a]-2-oxo-4-ethyl - 9,10 - dimethoxy - 1,2,3,4,5,6,7-heptahydro-11b-H-[3,5a]diazepine hydrochloride.

In the case of the corresponding nitrate, sulfate or bisulfate, phosphate or acid phosphate, acetate, lactate, citrate or acid citrate, tartrate or bitartrate, oxalate, succinate, maleate, gluconate and saccharate salts, the respective acid and the appropriate 1,4-diazepine derivative are both dissolved in ethanol and the two solutions are then mixed, followed by the addition of diethyl ether to the resulting reaction mixture in order to effect the precipitation of the desired salt from said solution. Thus, when 3 g. (0.01 mole) of naphth-[1,2-a]-2-oxo-4-[β-(3,4,5 - trimethoxybenzoyloxy)ethyl] - 9,10 - dimethoxy-1,2,3,4,5,6,7 - heptahydro - 11b - H - [3,5a]diazepine reacts with an equimolar amount of glacial acetic acid as described in the above manner, the corresponding product obtained is the acetic acid addition salt of naphth-[1,2-a]-2-oxo-4 - [β-(3,4,5 - trimethoxybenzoyloxy)ethyl] - 9,10-dimethoxy - 1,2,3,4,5,6,7 - heptahydro - 11b - H - [3,5a]-diazepine.

*Example VII*

Naphth - [1,2-a] - 2 - oxo - 4 - ethyl - 9,10 - dimethoxy-1,2,3,4,5,6,7-heptahydro-11b-H-[3,5a]diazepine is reacted with an equimolar amount of methyl chloride in an isopropanol solvent medium by allowing said reaction solution to stand at room temperature for 18 hours, and then raising the temperature to 90–100° C. for 30 minutes. The crystals which separate can be recrystallized from isopropanolmethyl ethyl ketone to afford the methyl chloride quaternary ammonium salt of naphth-[1,2-a]-2-oxo-4-ethyl-9,10-dimethoxy-1,2,3,4,5,6,7 - heptahydro - 11b-H-[3,5a]diazepine.

This same 1,4-diazepine base also reacts with methyl iodide in anhydrous diethyl ether to offer the corresponding quaternary ammonium iodide. Reaction of the above base with ethyl bromide in methyl ethyl ketone at 50–60° C. for 18 hours and then at 100° C. for 2 hours yields the corresponding ethyl quaternary ammonium bromide.

In the same manner, each of the other 1,4-diazepine compounds reported in Examples II–V react with each of the aforementioned methyl halides, as well as with allyl chloride and benzyl bromide, to afford the corresponding quaternary ammonium halides. Similarly, reaction of each of these 1,4-diazepine bases with such reagents as dimethyl sulfate, diethyl sulfate, methyl benzenesulfonate and ethyl p-toluenesulfonate yields the corresponding quaternary ammonium sulfates in each case.

*Example VIII*

A dry solid pharmaceutical composition is prepared by blending the following materials in the proportions by weight specified:

Naphth - [1,2-a] - 2 - oxo-4-ethyl - 9,10-dimethoxy-
  1,2,3,4,5,6,7 - heptahydro-11b-H-[3,5a]diazepine__ 10
Dicalcium phosphate_____ 45
Potato starch_____ 20
Lactose _____ 15
Polyvinylpyrrolidone _____ 8
Magnesium stearate_____ 2

After the dried composition is thoroughly blended, tablets are punched from the resulting mixture, each tablet being of such size that it contains 50 mg. of the active ingredient.

Example IX

A dry solid pharmaceutical composition is prepared by combining the following materials in the proportions by weight specified:

Naphth - [1,2-a] - 2 - oxo-4-isobutyl-9,10-dimethoxy-1,2,3,4,5,6,7 - heptahydro-11b-H-[3,5a]diazepine__ 10
Polyethylene glycol (average molecular weight, 6000) ------------------------------------------ 30
Lactose ----------------------------------------- 40
Calcium carbonate ------------------------------- 20

The dried solid mixture so prepared is then thoroughly agitated so as to obtain a powdered product that is completely uniform. Soft elastic and hard shelled gelatin capsules containing this pharmaceutical composition are then prepared, employing a sufficient quantity of material so as to furnish 250 mg. of the active ingredient in each capsule.

Example X

An aqueous propylene glycol solution containing naphth - [1,2-a] - 2 - oxo - 4 - ($\gamma$ - hydroxypropyl) - 9,10-dimethoxy - 1,2,3,4,5,6,7 - heptahydro - 11b - H - [3,5a]-diazepine hydrochloride is prepared by dissolving the latter compound in propylene glycol-water (1:3 by weight) with the aid of gentle heating. The amount of compound employed is such that the resulting solution contains 5 mg. of the active ingredient per ml. After cooling the solution to room temperature, it is sterilized by means of filtration through a Seitz filter. The sterile aqueous propylene glycol solution so obtained is suitable for intramuscular administration to animals.

What is claimed is:
1. A compound selected from 1,4-diazepines of the formula:

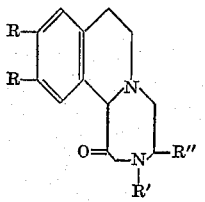

wherein each R represents a member of the group consisting of hydrogen, hydroxy, lower alkoxy and alkyl, and when both R groups are taken together they form methylenedioxy, R' represents a member of the group consisting of hydrogen, lower alkenyl, alkyl, hydroxyalkyl, acyloxyalkyl, lower alkoxyalkyl, lower dialkylaminoalkyl, benzyl, chlorobenzyl, xylyl and β-phenylethyl, and R" represents a member of the group consisting of hydrogen, lower alkenyl, alkyl, hydroxyalkyl, acyloxyalkyl, lower alkoxyalkyl, lower dialkylaminoalkyl, β-phenylethyl, benzyl, xylyl, p-chlorobenzohydryl, thenyl, furfuryl, phenyl, chlorophenyl, tolyl, anisyl, thienyl and furyl, each alkyl moiety in R, R' and R" having from one to five carbon atoms and said acyl moiety being the acyl moiety of from a hydrocarbon monocarboxylic acid having from two to eight carbon atoms; and the pharmaceutically acceptable acid addition salts thereof and the pharmaceutically acceptable quarternary ammonium salts thereof.

2. Naphth-[1,2-a]-2-oxo-4-lower alkenyl-9,10-di(lower alkoxy)-1,2,3,4,5,6,7-heptahydro-11b-H-[3,5a]diazepine.

3. Naphth-[1,2-a]-2-oxo-4-alkyl-9,10-di(lower alkoxy)-1,2,3,4,5,6,7-heptahydro-11b-H-[3,5a]diazepine, said alkyl having from 1 to 5 carbon atoms.

4. Naphth - [1,2-a] - 2 - oxo - 4 - ethyl - 9,10 - dimethoxy-1,2,3,4,5,6,7-heptahydro-11b-H-[3,5a]diazepine.

5. Naphth - [1,2-a] - 2 - oxo - 4 - hydroxyalkyl - 9,10-di(lower alkoxy)-1,2,3,4,5,6,7-heptahydro-11b-H-[3,5a]-diazepine, said alkyl having from 1 to 5 carbon atoms.

6. Naphth - [1,2-a] - 2 - oxo - 4 - (β - hydroxyethyl)-9,10 - dimethoxy - 1,2,3,4,5,6,7 - heptahydro - 11b - H-[3,5a]diazepine.

7. Naphth - [1,2-a] - 2 - oxo - 4 - dialkylaminoalkyl-9,10 - di-(lower alkoxy)-1,2,3,4,5,6,7-heptahydro-11b-H-[3,5a]diazepine, there being from 1 to 5 carbon atoms in each alkyl portion of the dialkylaminoalkyl group.

8. Naphth - [1,2-a] - 2 - oxo - 4 - phenylalkyl - 9,10 - di-(lower alkoxy)-1,2,3,4,5,6,7-heptahydro-11b-H-[3,5a]diazepine, the alkyl portion of the phenyl alkyl group having from 1 to 2 carbon atoms.

9. Naphth - [1,2-a] - 2 - oxo - 4 - acyloxyalkyl - 9,10-di(lower alkoxy)-1,2,3,4,5,6,7-heptahydro-11b-H-[3,5a]diazepine, the acyl portion of said acyloxyalkyl group being the acyl radical of a hydrocarbon monocarboxylic acid having from 2 to 8 carbon atoms and the alkyl having from 1 to 5 carbon atoms.

No references cited.